Patented Feb. 19, 1935

1,991,981

UNITED STATES PATENT OFFICE 1,991,981

COLORED SILICATE GRANULE FOR ROOFING AND MODE OF PREPARING SAME

Carl E. Hillers, Charlottesville, Va., assignor to Blue Ridge Slate Corporation, Charlottesville, Va., a corporation of Virginia No Drawing. Application April 25, 1934, Serial No. 722,377

13 Claims. (Cl. 91—70)

This invention relates to the improvement of the processes employed to permanently color mineral granules or other refractory granular material. Such colored granular material is used commercially as a surfacing for artificial shingles or roofing (made for example, by impregnating heavy paper with bitumen) by embedding the granules in the weather resisting layer of bituminous material on the surface of a felt impregnated or saturated with a bituminous material.

One known method of producing such colored granular material in the industry, is known as the "silicate process", and granules colored by this process are known as "silicate granules" or "silicated granules". This process, which is quite extensively used at the present time involves the application to refractory granules (of stone, slag, slate, ceramic material, or the like) of a colored layer of an alkali metal silicate, usually sodium silicate, although cost alone rules potassium silicate out of the picture.

Usually the sodium silicate is used as an aqueous solution which thus serves to cause the coloring material to adhere to and be well distributed over the surface of the granules or granulated material in the early stages of the process. The coloring agents employed are usually metallic oxides, earth colors, iron salts or salts containing other metals, and the ultramarines or mixtures of these. The process in general is described in U. S. Patents Nos. 1,169,506; 1,572,425, and others. Various modifications of these processes have been patented, but in all cases, finished granules so coated and colored, after the heat treatment and cooling, are subject, under certain weather conditions, to the formation of an excrescence of efflorescence or "bloom," which is objectionable.

The "bloom" is usually crystalline sodium carbonate, which is produced by the absorption of carbon dioxide during the manufacture of the granules and/or after the granules have been exposed to the air. The carbon dioxide is absorbed by the sodium hydroxide which is formed by hydrolysis of the sodium silicate. In some cases this efflorescence "bloom" is in part crystalline sodium sulfate, which is formed as a result of absorption of sulfur dioxide during the manufacture and/or after the manufacture has been completed. Sulfur dioxide combines with the sodium hydroxide, formed by hydrolysis of the sodium silicate, producing sodium sulfite, which atmospheric oxygen converts to sodium sulfate. In rarer cases, observable only when salts or oxides containing chromium are used (as in making green granules) small amounts of sodium dichromate or chromate may be present in the efflorescence, but this is not usually very troublesome.

When such colored granules are used in commerce as a surface coat for "asphalt shingles", certain atmospheric conditions result in the appearance of a "bloom" of the type described above, to some extent obscuring the color which has been imparted to the granules, and although in time, the bloom may usually be washed off during rainstorms, it is objectionable to the purchaser and manufacturer of the shingles. The conditions necessary to produce a visible bloom are: (1st) The absorption of moisture by the granules, either from rain, dew, frost or atmospheric humidity; and (2nd) exposure of the moisture laden coated granules to a dry atmosphere, particularly a dry cool atmosphere. During such action, the moisture may evaporate, leaving behind on the surface of the granule, its soluble salts, often in crystalline form. Several successive moistenings and dryings may be necessary before this surface coating of soluble salts becomes strikingly visible as a "bloom".

To overcome this efflorescing or blooming tendency of "silicate granules", several practices have been employed. In one method, the colored "silicate granules", after the heat treatment and cooling have been washed with water in order to extract the alkali metal hydroxide and carbonate. In another method, the "silicate granules" have been "acid-treated" by soaking or washing in dilute acids, such as muriatic, sulfuric, hydrofluosilicic, cresylic, etc., either alone or in combination, and generally such acid washing has been followed by water washing to remove both the alkali metal salts of the acid employed and all traces of the acid itself. In a third method, the "silicate granules" have been treated by soaking or washing in dilute aqueous solutions of inexpensive metallic salts, such as calcium chloride, aluminum sulfate, etc., and subsequently washing with water to remove the excess salt together with the products of reaction, such as calcium hydroxide and carbonate and alkali metal chloride, if calcium chloride be used; or aluminum hydrate and carbonate, and alkali metal sulfate, if alum be used. However, any of the above three practices, if conducted rapidly, are besides being expensive, seldom efficient in minimizing bloom, unless conducted in hot water or hot solution, in which case the color intensity is diminished and the granules thereby rendered less attractive. The heating of the large amounts of water, also involves considerable expense. On the other hand, protracted treatment and/or washing at lower temperatures requires large investment for plant, equipment and storage, and results in a sluggish rather than a flexible manufacturing operation.

There are two instances where efflorescence is particularly objectionable. In the first place, where bundles of shingles have been delivered by a dealer to a customer they may stand exposed to the elements and be rained upon, or in some other way become moistened. If such bundles of shingles are dried by the atmosphere more or less efflorescence may form upon certain portions of the surface or the total surface of some or all of the shingles, and when the bundle is opened various degrees of obscurement of the colored coating may be observed. The cause for the development of efflorescence on the shingles in such cases usually is not understood by the purchaser of the shingles nor by the person who is to apply the shingles to the roof and dissatisfaction results.

The other place where this efflorescence may be particularly objectionable is after shingles coated with such colored granules have been applied to the roof of a building or to the sides of the building. Certain series of different atmospheric conditions cause this efflorescence to develop on the shingles after they have been applied to the building. Although the crystalline efflorescent material, being soluble in water, will wash off in part or completely during rain storms, this frequently does not prevent its reappearance later. Also, when the shingles have been applied to the side of the building there are certain areas of the side of the building which are protected from direct rainfall, such as the portions under the eaves. When efflorescence occurs on the shingles at that portion of the side of the building which rain does not directly wet, nature is prevented from removing it, and it frequently may remain for months.

My invention provides means for preventing colored silicate granules from "blooming". I have found that the tendency or ability of such silicate granules to effloresce can be greatly minimized or totally eliminated by incorporating certain materials with the sodium silicate and coloring ingredients which are the primary materials used for producing the coating. The materials which I use are the borates of the alkaline earth metals, under which term I include magnesium borate, calcium borate, strontium borate and barium borate, and I use either one or a combination of two or more of these to produce the desired effect. I shall deal more particularly in the following description, with calcium borate, but it is to be understood that the same or similar effects can be produced by the use of any one or a combination or a mixture of the above four borates when substituted in equivalent chemical amount for calcium borate; except where one of the other three is specifically mentioned.

For a thorough understanding of what types of alkaline earth metal borates produce the desired effect, it is necessary to discuss some of the types and methods of making them, but without any intention of claiming these methods as novel.

(1) Hydrated calcium metaborate suitable for my purpose may be manufactured synthetically by what may be termed the "wet process", by mixing 500 pounds of boric acid, 300 pounds of hydrated lime (figured as actual calcium hydrate) and 500 pounds of water, heating the mixture to the boiling point and boiling for five minutes while stirring the same, then evaporating off the excess water, preferably in a steam jacketed pan or pot. By "excess water" is meant such water over and above the amount needed to satisfy the water of crystallization requirements of calcium metaborate.

(2) A hydrated barium metaborate may be prepared in similar manner from 315 pounds of barium hydrate and 124 pounds boric acid with 150 pounds or less of water.

(3) A hydrated strontium metaborate may be prepared similarly from 266 pounds of strontium hydrate, 124 pounds of boric acid and 150 pounds of water.

(4) A hydrated magnesium metaborate can be made in like manner from 125 pounds of boric acid, 40 pounds of magnesium oxide and 200 pounds of water, but the boiling should be conducted for twenty minutes.

(5) It is also possible to use anhydrous alkaline earth metal borates made by heating ("calcining") an intimate mixture of alkaline earth metal oxide or hydroxide or carbonate with boric acid, without water. The temperature necessary to produce the alkaline earth metal borate here depends upon the metal and the form in which it is used, but is below the fusion point of the alkaline earth metal borate itself.

(6) It is further possible to obtain the desired reduction in "blooming" of the "silicate granules" by using other proportions (besides those necessary to form the metaborates) of the alkaline earth metal part and the boric acid part in either the "wet process" or the "calcining" process. The limitations upon the proportions are governed by the reactivity of the resulting borate toward aqueous solutions of sodium silicate; if they are too high in metal portion they will be too soluble and too alkaline and will therefore produce precipitation from cold aqueous solutions of sodium silicate. If they are too high in boric acid portion, they will likewise produce precipitations from cold aqueous solutions of sodium silicate. Therefore, the nearer the composition of an alkaline earth metal borate approaches to the metaborate proportions, the more miscible it becomes with cold aqueous sodium silicate solutions without causing precipitation.

(7) The invention however, is not restricted to the use of synthetically manufactured alkaline earth metal borates, since a number of such materials which occur in nature, such as the minerals "colemanite" and "pandermite" are often of sufficient purity for use in my process.

The alkaline earth metal borate may be easily incorporated into the colored silicate coating by any of several methods. Three methods only will be mentioned but to those familiar with the art it will be readily apparent that modifications and changes in the order of adding some of the ingredients are possible.

(1st) It may be considered along with coloring material and incorporated by the method disclosed by Fisher in U. S. Patent No. 1,572,425.

(2nd) It may be ground up with the other ingredients to produce a paint, by the method like that of Small, as disclosed in U. S. Patent No. 1,921,010.

(3rd) The method I prefer, however, is as follows:

("Preferred Method")—Mix the refractory granular material with the powdered coloring material (as for example, chromium oxide to produce a green color), and the powdered alkaline earth metal borate for two or three minutes, all being in the dry state. Then add the sodium silicate solution together with water to dilute or thin the mix, if required, and continue the mixing for another four to six minutes, when the granular material thus mixed and coated and still wet (hereinafter called the "wet coated granules") will be ready for the drying and heat treatment steps.

The "wet coated granules" are then first dried to remove most of the water or conveyed directly, while still wet, into the heat treating device. This may conveniently be an internally oil-fired rotary kiln or dryer, or any equivalent heating arrangement. The heat treatment involves heating the "wet coated granules" gradually for five or six minutes, during which time the temperature of the granules is raised to a maximum ranging from 600° to 1200° F. (the heating being effected while being agitated to prevent "caking" during the early stages). Following this heat treatment, the granules are allowed to cool, either in piles exposed to air or preferably the cooling is assisted by passing them through or over water cooled pipes.

In the examples, I state certain preferred periods of time, by way of example. These time periods apply more particularly when the materials are being handled commercially, as in an ordinary rotary cement mixer. Considerable latitude as to mixing equipment, time of mixing, etc. would be allowed.

One formula, showing proportions of materials, by which in conjunction with the "preferred method" of mixing and a definite heat treatment in a rotary kiln, I am able to produce green colored "silicate granules", which are quite free from the tendency to "bloom", follows:

| | Lbs. |
|---|---|
| Granular slate | 2000 |
| Chromium oxide ("green") | 15 |
| Aqueous solution sodium silicate (sp. gr. 1.40, factor 1Na2O to 3.25SiO2) | 100 |
| Hydrated calcium metaborate | 6 |
| Water | 5 |

It is to be understood that in the above formula, the amounts given are only illustrative. The amount and kind of the color pigment, can be varied, depending on the strength or intensity of the particular color desired. Instead of a single coloring agent, mixtures of two or more can be used. The amount of sodium silicate, and the ratio of $Na_2O$ to $SiO_2$ in the silicate can be varied.

The amount of the hydrated calcium metaborate can vary, e. g. between about 5 and 15 lbs. The amount of water can be varied between wide limits.

In the above formula, I have shown the amount of calcium borate as 6 lbs. per ton of slate granules. However, I do not wish to restrict myself to this amount, since in some cases, less calcium borate is needed, while in other cases, more calcium borate must be used. The amount required is in general, dependent upon two factors: 1st, the amount of alkali metal silicate used; and 2nd, the temperature employed during the heat treatment. Since it is impossible to limit the amount of alkali metal silicate which one may use in producing a ton of "silicate" granules, because of the possibility of applying any number of color coats, I will merely state that I have usually found from 5 lbs. to 15 lbs. of calcium borate per 100 lbs. of aqueous sodium silicate solution, sp. gr. 1.40, factor 1Na2O to 3.25SiO2, to be sufficient and practical. In the event that alkali metal silicate solutions of other gravities, or different factors be employed, the requirement of calcium borate can be best calculated in advance by relation to the actual weight of $Na_2O$ present or used, compared to a silicate solution of gravity and factor mentioned. However, many variations of this sort are possible without departing from the spirit of my invention, and I do not wish to limit the amount of calcium borate which I may employ in my process.

Suitable and preferred mixing and heating specifications for this formula are:

| | |
|---|---|
| Period of mixing slate, "green" and calcium borate | 2 minutes |
| Period of mixing slate, "green", calcium borate, water and sodium silicate solution | 5 minutes |
| Drying, as a separate step, omitted. | |
| Heating period | 5 minutes |
| Maximum temperature of granules during heating period | 950° F. |

In the foregoing example, I have shown how "bloom" resistant silicate granules can be produced from a base of granulated slate. It will be readily understood that I do not wish to be restricted to the use of slate as a base, for the desired effect, i. e. bloom resistant colored "silicate granules", is obtained upon various other refractory granular mineral or ceramic materials e. g. flint, quartz, quartzite, feldspar, porcelain, brick, slag, granite, trap-rock, bluestone, greenstone, shale, sand, gravel, certain limestones, soapstone and sandstone.

Any material, whether of mineral or ceramic origin, which is capable of withstanding the mixing procedure and heat treatment and which could be used as a base for preparing colored "silicate granules" by the older processes, can also be used by my present process to produce bloom resistant colored silicate granules.

In the formula given, I have shown how bloom resistant green "silicate granules" can be produced. It will be quite evident to one skilled in the art that granules of other colors besides green can be produced by the use of other pigments or coloring agents, and that I therefore do not wish to restrict myself to any one color of bloom resistant "silicate granules".

Where the refractory mineral matter to be used for the base contains sulfides, or some other chemical form of sulfur capable of being converted into sodium sulfate, as I have hereinbefore described, I have found that it is preferable to use barium borate instead of calcium, strontium or magnesium borate in order to produce bloom resistant colored silicate granules. The greater insolubility of barium sulfate as compared with the sulfates of the other three alkaline earth metals readily explains the better bloom eliminating action of the barium borate under such conditions.

I am aware that the use of the minerals colemanite, pandermite, etc., in preparing fused glazes for decorating or enamelling or coloring ceramic ware, etc., is not new. I am also aware that the use of frits which may contain amounts of alkaline earth metal oxides and boric acid has been practiced in the ceramic arts for many years. I am also aware that the use of boric acid and borax in producing fused glassy coatings upon refractory mineral or ceramic granular material has been referred to in several Letters Patent, particularly by Fisher (U. S. No. 1,742,440), Sewall (U. S. No. 1,831,469), and possibly Brown (U. S. No. 1,831,784). In all such uses, the purpose of such additions has been to aid and assist in rendering the ingredients of the glaze, enamel, frit, or coating fusible and the application of the fused glaze, enamel, frit, or coating to the body underneath is carried out, at some stage of the heating process, while the ingredients are in a molten condition. Considerable distinction has been drawn between such fused, glassy coatings, particularly as they have been applied in the manufacture of colored granules, on the one hand, and the non-fused, dehydrated colored "silicate granules", on the other. I particularly wish to stress the fact that by the use of alkaline earth metal borates, in accordance with my invention, I have been able to induce an alkaline earth metal to be dispersed through the sodium silicate and to form a solid dispersion of an alkaline earth metal in sodium silicate without fusing or melting either the alkaline earth metal borate, the sodium silicate or the dispersion of the one in the other, and at the same time have obtained to a considerable extent the greater resistivity to blooming of a lime-soda glass, or a magnesia-soda glass or a barium-soda glass, or a strontia-soda glass, or a combination of two or more of these.

By the use of borates of the said alkaline earth metals, I am able to obtain miscibility at normal atmospheric temperatures between an alkaline earth metal borate and sodium silicate solutions, and at the same time the alkaline earth metal is in such chemical form that it will react with or dissolve in the sodium silicate at temperatures from 600° F. upwards to produce in part the bloom resistivity of an alkaline earth metal soda glass.

I find that although calcium borate, for example, is practically insoluble in and non-reactive with aqueous sodium silicate below 100° F., yet if the two be heated together above 200° F. a resistivity to bloom becomes noticeable, which becomes more pronounced as the temperature of the heat treatment is increased up to about 1200° F. Above 1200° F. my tests show, particularly with chromium compounds as coloring agents, that changes sometimes occur which result in the development or formation of a sodium chromate or dichromate efflorescence when the colored granules are later exposed to weathering conditions. Below 600° F., however, dehydration of the colored sodium silicate film appears (in the case of many of the minerals) to be insufficient to insure permanence of the colored silicate coating on the granule when subjected to outdoor exposure. Apparently, if the dehydration is carried out at temperatures below 600° F. some re-hydration may slowly occur when the silicate film is exposed to moisture later, with consequent loss of some color intensity. This inability of "silicate" granules, in the manufacture of which the heat treatment did not exceed approximately 600° F. to withstand prolonged outdoor exposure, is not the specific result of the addition of an alkaline earth metal borate as in my process of producing "bloom" resistant "silicate granules", but is a weakness of the alkaline silicate itself.

In the example hereinbefore given which illustrates how bloom resistant green "silicate granules" can be produced by my process, I specified a maximum temperature during the heating treatment of 950° F. To produce a "silicate granule" of uniform color and bloom resistance, it is necessary to control the manufacturing operation within definite limits with a given formula. Numerous variations in color can be produced, as is well known to those familiar with the art, by varying certain conditions, even with the same formula. To illustrate, everything else (formula, mixing, etc.) being equal, varying the temperature of the heating step will frequently produce different shades of color in the silicate granule, and whereas one of the shades might be readily salable, certain others may not. Furthermore it is not always the shades produced at any given temperature which enjoy the greatest salability.

For the best results the maximum temperatures in the heating step, between 600 and 1200° F., will be found to be most suitable in the production of the bloom-resistant granules, by the present process.

I am aware that it has been proposed, as by Denning in U. S. Patent No. 1,876,629, to produce insoluble silicate coated granules by the use of certain calcium and magnesium "fixing compounds" and soluble silicates. Such fixation does not minimize efflorescence noticeably when the granules are heated at temperatures "preferably not above 600° F." (p. 2 line 11). In actual practice, the "fixing compounds" mentioned are difficult to employ because they react so rapidly with aqueous solutions of soluble silicates, precipitating calcium or magnesium silicates in the cold, that the adhesive nature of the wet soluble silicate is lost, and, by comparison, I find the alkaline earth metal borates much less reactive under similar conditions.

It will be understood that the borates of the alkaline earth metals, as set forth herein, do not considerably obscure the colors produced by the pigments, because the pigmenting power or opacity of said borates is low.

I claim:—

1. In the manufacture of colored "silicate granules", the herein described process which comprises spreading over the surface of granules of an insoluble refractory base, a coloring substance of which the color is not destroyed by heating, and an alkaline earth metal borate, and a soluble silicate, and thereafter heating the granules to a temperature between about 600° F. and 1200° F., whereby artificially colored granules, at least largely free from tendency to "bloom" are produced.

2. A process for producing bloom resistant colored "silicate granules" of the character described, which comprises first coating granular insoluble mineral material with an aqueous solution containing an alkali metal silicate, together with a coloring agent and applying finely divided alkaline earth metal borate, drying the coating on the surface of the said granular material and heating said material to a temperature between about 600° F. and about 1200° F. and cooling the granules.

3. A process for producing bloom resistant colored "silicate granules" of the character described, which comprises first coating granular refractory material with an aqueous solution containing an alkali metal silicate together with a coloring agent and applying finely divided alkaline earth metal borate, drying the coating on the surface of the said granular refractory material and heating said material to a temperature between about 600° F. and about 1200° F. and cooling the granules.

4. A process for producing bloom resistant colored "silicate granules" of the character described, which comprises first coating granular insoluble mineral material with an aqueous solution containing an alkali metal silicate together with a coloring agent and applying finely divided calcium borate, drying the coating on the surface of the said granular material and heating said material to a temperature between about 600° F. and about 1200° F. and cooling the granules.

5. In the process of making colored "silicate granules" of the character described, the step of adding alkaline earth metal borate, in a state of fine subdivision, to ingredients used to produce the colored "silicate" coating on the refractory granular material, whereby the said borate will act to substantially reduce efflorescence of the character described, in the finished granules.

6. In the process of making colored "silicate granules" of the character described, the step of adding calcium borate, in a state of fine subdivision, to ingredients used to produce the colored "silicate" coating on the refractory granular material, whereby the said borate will act to substantially reduce efflorescence of the character described, in the finished granules.

7. In the process of making colored "silicate granules" of the character described, the step of adding an alkaline earth metal borate in a state of fine subdivision, to the mixture containing coloring agents and a solution of an alkali-metal silicate, with a material selected from the group consisting of color intensifying agents, blister preventing agents, hardening agents and insolubilizing agents; whereby said borate can act to minimize efflorescence of the character described.

8. A process for producing bloom resistant colored "silicate granules" of the character described, which comprises coating granular insoluble mineral material with an aqueous solution containing an alkali metal silicate, together with a coloring agent and a finely divided alkaline earth metal borate, drying the coating on the surface of the said granular material and heating said material to a temperature between about 600° F. and about 1200° F. and cooling the granules.

9. A process for producing bloom resistant colored "silicate granules" of the character described, which comprises coating granular insoluble mineral material with an aqueous solution containing an alkali metal silicate, together with a coloring agent and a finely divided alkaline earth metal borate, drying the coating on the surface of the said granular material and heating said material to a temperature high enough to render the coating resistant to hot and cold water.

10. In the process of making colored "silicate granules" of the character described, the step of including an alkaline earth metal borate, in a state of fine subdivision, in the ingredients used to produce the colored "silicate" coating on the refractory granular material, whereby the said borate will act to substantially reduce efflorescence of the character described, in the finished granules.

11. New article of manufacture consisting of bloom resistant colored "silicate granules", which carries an alkaline earth metal borate and coloring agent intimately bonded thereto, whereby the natural tendency of the "silicate" coating to effloresce is lower than in the case of the commonly employed "silicate granules" having water glass in the coating thereof.

12. Colored granular refractory material carrying a coating comprising alkali metal silicate, an alkaline earth metal borate and a coloring pigment bonded together, such granular material being relatively free from tendency to "bloom".

13. Roofing sheets impregnated with bituminous material and coated with bloom-resistant colored "silicate granules" of the character described in claim 12.

CARL E. HILLERS.